(12) United States Patent
Ro et al.

(10) Patent No.: US 11,782,187 B2
(45) Date of Patent: Oct. 10, 2023

(54) CALCULATION METHOD OF TOTAL ARTIFICIAL PRECIPITATION IN SEEDING AREA COMPARED TO NON-SEEDING AREA

(71) Applicant: National Institute of Meteorological Sciences, Jeju-do (KR)

(72) Inventors: Yonghun Ro, Jeju-do (KR); Ki-Ho Chang, Seoul (KR); Joo-Wan Cha, Jeju-do (KR); Sanghee Chae, Jeju-do (KR); Woonseon Jung, Jeju-do (KR); Chulkyu Lee, Seoul (KR)

(73) Assignee: National Institute of Meteorological Sciences, Jeju-do (KR)

( * ) Notice: Subject to any disclaimer, the term of this patent is extended or adjusted under 35 U.S.C. 154(b) by 333 days.

(21) Appl. No.: 17/124,733

(22) Filed: Dec. 17, 2020

(65) Prior Publication Data

US 2022/0113450 A1 Apr. 14, 2022

(51) Int. Cl.
  *G01W 1/14* (2006.01)
  *A01G 15/00* (2006.01)
  *G01S 13/95* (2006.01)

(52) U.S. Cl.
  CPC .............. *G01W 1/14* (2013.01); *A01G 15/00* (2013.01); *G01S 13/95* (2013.01)

(58) Field of Classification Search
  None
  See application file for complete search history.

(56) References Cited

U.S. PATENT DOCUMENTS

| | | | |
|---|---|---|---|
| 10,888,051 B2 * | 1/2021 | DeFelice | A01G 15/00 |
| 11,256,000 B2 * | 2/2022 | Xue | G01W 1/10 |
| 2018/0032885 A1 * | 2/2018 | Chae | G06Q 10/06 |
| 2018/0082001 A1 * | 3/2018 | Yang | A01G 15/00 |
| 2019/0364748 A1 * | 12/2019 | Chae | A01G 15/00 |

* cited by examiner

*Primary Examiner* — Andre J Allen
*Assistant Examiner* — Jermaine L Jenkins
(74) *Attorney, Agent, or Firm* — WRB-IP PLLC (57) ABSTRACT

A method is provided of calculating the total amount of artificial precipitation in a seeded area compared to a non-seeded area, which is capable of increasing the reliability of quantitative determination of seeding effect, observation data, and numerical model prediction data obtained from artificial precipitation experiments, of increasing the amount of water resources through weather modification experiments, of accomplishing various effects (drought reduction, forest fire prevention, fine dust reduction, fog reduction, hail suppression, etc.) and other related applications through artificial rainfall experiments, of improving the accuracy of correction and prediction of a numerical model obtained through weather modification experiments based on observation data, of establishing experimental and observation strategies for improving seeding efficiency in weather modification experiments, of developing the field of study on cloud development and fine physical changes in the cloud after seeding, and of improving the economic feasibility of artificial rainfall experiments.

10 Claims, 5 Drawing Sheets
(3 of 5 Drawing Sheet(s) Filed in Color)

| | GROUND(12:00~18:00) | | | RADAR(12:00~18:00) | | |
|---|---|---|---|---|---|---|
| | SEEDED AREA | NON-SEEDED AREA | ARTIFICIAL PRECIPITATION INCREASE/DECREASE AMOUNT (SEEDING - NON-SEEDING) | SEEDED AREA | NON-SEEDED AREA | ARTIFICIAL PRECIPITATION INCREASE/DECREASE AMOUNT (SEEDING - NON SEEDING) |
| MAXIMUM VALUE(mm) | 6.00 | 3.50 | 2.50(RAIN INCREASE) | 7.30 | 2.02 | 5.28(RAIN INCREASE) |
| AVERAGE(mm) | 4.42 | 2.33 | 2.09(RAIN INCREASE) | 2.89 | 1.92 | 0.97(RAIN INCREASE) |
| STANDARD DEVIATION(mm) | 1.12 | 1.26 | | 1.87 | 0.09 | |

FIG. 5

CALCULATION METHOD OF TOTAL ARTIFICIAL PRECIPITATION IN SEEDING AREA COMPARED TO NON-SEEDING AREA

BACKGROUND AND SUMMARY

The present invention relates to a method of calculating the total amount of artificial precipitation in a seeded area compared to a non-seeded area, and more particularly to a method of calculating the total amount of artificial precipitation in a seeded area compared to a non-seeded area, which is obtained through experiments in which seeding materials are seeded in an experimental area in order to stimulate artificial precipitation in a target region, after which the total amount of artificial precipitation the area that is influenced by the seeding materials compared to the area that is not influenced by the seeding materials is calculated so as to lay a foundation for aggressively solving a water shortage phenomenon through artificial precipitation using seeding materials, to increase the reliability of quantitative determination of seeding effect, observation data, and numerical model prediction data obtained from artificial precipitation experiments in the short term, to increase the amount of water resources through weather modification experiments, and to accomplish various effects (drought reduction, forest fire prevention, fine dust reduction, fog reduction, hail suppression, etc.) and other related applications through artificial rainfall experiments in the long term.

Recently, due to a phenomenon of abnormal temperatures attributable to climate change, various kinds of unusual weather, such as typhoons, localized torrential rain, heavy snow, and drought, have appeared, and have directly or indirectly caused material and economic losses.

In most of the country, the average annual precipitation is low, and the precipitation is concentrated in one season such as summer. Further, there are large regional and seasonal variations in precipitation, thus leading to many problems attributable to the lack of precipitation in the other seasons.

In the situation in which natural water resources are limited, dam construction, river water filtration, seawater desalination, deep sea water, artificial rain and snow increase, may be considered as measures to secure alternative water resources.

Among these alternatives, the artificial rain and snow increase, called 'artificial precipitation increase' for short, is a desirable measure because it is capable of securing water resources and of reducing drought damage at relatively low cost while minimizing environmental problems attributable to development thereof.

The artificial rain increase is a technology of stimulating cloud development and condensation through cloud seeding (hereinafter referred to as 'seeding') in an area in which there is a possibility of rainfall due to the presence of a cloud layer but the expected amount of precipitation is small, thereby increasing the amount of precipitation or causing rain to fall in other areas, and the artificial snow increase is a technology of causing snow to fall, instead of rain, at relatively low temperatures.

Experiments for such artificial precipitation increase are broadly divided into aerial experiments and around experiments, among which aerial experiments are more effective.

The most important thing in aerial experiments for artificial precipitation increase is to set up and determine a seeding line. It is effective for the seeding line to be located at a point or an altitude at which the cloud liquid water content (or cloud water content) is the highest.

As a related art document, Korean Patent Registration No. 2008698 is disclosed.

The method of calculating the seeding line for artificial rain increase through an aerial experiment in consideration of the cloud liquid water content, which is disclosed in the above related art document, includes a step of calculating numerical forecast model data on a target area, a step of calculating an average hourly total cloud liquid water content (or liquid water path (LWP)) in the target area based on the numerical forecast model data, a seeding-time-setting step of determining the time period during which the cloud liquid water content (or LWP) is the highest, a seeding-point-setting step of calculating the latitudes and longitudes of the intermediate point and both end points of the seeding line in the target area, a liquid water content (LWC) calculation step of calculating the maximum LWC in the cloud in the areas spaced a predetermined distance apart from the intermediate point of the seeding line in leftward, rightward, upward, and downward directions, and a step of selecting, upon determining that the maximum LWC is greater than 0, a seeding line and a seeding altitude corresponding to the layer in which the maximum LWC appears and displaying the seeding line and the seeding altitude.

The applicant of the present application proposes a method of calculating the total amount of artificial precipitation in a seeded area compared to a non-seeded area as the present invention, which is distinguished over the above conventional art.

It is desirable to provide a method of calculating the total amount of artificial precipitation in a seeded area compared to a non-seeded area, in which seeding materials are seeded in an experimental area in order to stimulate artificial precipitation in a target region, after which the total amount of artificial precipitation in the area that is influenced by the seeding materials compared to the area that is not influenced by the seeding materials is calculated so as to lay a foundation for aggressively solving a water shortage phenomenon through artificial precipitation using seeding materials.

It is desirable to provide a method of calculating the total amount of artificial precipitation in a seeded area compared to a non-seeded area so as to control the occurrence of precipitation, among meteorological phenomena, thereby enabling preparation for various disasters and stable supply of water resources.

It is desirable to provide a method of calculating the total amount of artificial precipitation in a seeded area compared to a non-seeded area, in which a quantitative increase in artificial precipitation in the area that is influenced by the seeding materials compared to the area that is not influenced by the seeding materials is calculated in order to verify the influence of seeding on precipitation increase after a weather modification experiment.

It is desirable to provide a method of calculating the total amount of artificial precipitation in a seeded area compared to a non-seeded area so as to calculate the amount of water resources that can be secured through a weather modification experiment using the amount of artificial precipitation in a seeded area.

It is desirable to provide a method of calculating the total amount of artificial precipitation in a seeded area compared to a non-seeded area so as to secure a sufficient amount of water through an artificial precipitation experiment, thereby leading to technology that lays a foundation for preparing measures to combat drought.

It is desirable to provide a method of calculating the total amount of artificial precipitation in a seeded area compared to a on-seeded area, which is obtained through experiments so as to increase the reliability of quantitative determination of seeding effect, observation data, and numerical model prediction data obtained from artificial precipitation experiments in the short term, to increase the amount of water resources through weather modification experiments, and to accomplish various effects (drought reduction, forest fire prevention, fine dust reduction, fog reduction, hail suppression, etc.) and other related applications through artificial rainfall experiments in the long term.

It is desirable to provide a method of calculating the total amount of artificial precipitation in a seeded area compared to a non seeded area so as to improve the accuracy of correction and prediction of a numerical model obtained through weather modification experiments based on observation data, to establish experimental and observation strategies for improving seeding efficiency in weather modification experiments, to develop the field of study on cloud development and fine physical changes in the cloud after seeding, and to improve the economic feasibility of artificial rainfall experiments.

In accordance with an aspect of the present invention, a method of calculating the total amount of artificial precipitation in a seeded area compared to a non-seeded area is provided, in which seeding materials are seeded in an experimental area in order to stimulate artificial precipitation in a target region and the total amount of artificial precipitation in the area that is influenced by the seeding materials compared to the area that is not influenced by the seeding materials is calculated, the method including an analysis time determination step (S10) of setting a time period during which the seeding materials seeded in the experimental area diffuse and have an influence on a rain gauge or a snow depth meter in the target region, a seeded-area-setting step (S20) of setting a seeded area including the point at which the artificial precipitation has the greatest influence on the rain gauge or the snow depth meter in the target region due to the diffusion of the seeding materials seeded in the experimental area and a diffusion range of the seeding materials, a non-seeded-area-setting step (S30) of setting a non-seeded area having the similar conditions for the atmosphere and topography as the seeded area, an artificial precipitation increase/decrease amount analysis step (S40) of calculating, when there are two or more places in each of the seeded area and the non-seeded area in which the rain gauge or the snow depth meter indicates accumulated precipitation of 0.1 mm or more, the precipitation average using precipitation data in the two or more places and the difference between the precipitation average in the seeded area and the precipitation average in the non-seeded area to analyze increase and decrease in the amount of artificial precipitation, and a total artificial precipitation amount calculation step (S50) of determining, when a precipitation increase occurs in die seeded area, the area of a region in which an accumulated precipitation increase is 0.1 mm or more as an effective area to calculate the total amount of artificial precipitation.

In the analysis time determination step (S10), when there is a small influence of natural precipitation, the analysis time may be determined considering the overall time during which the target region is influenced by the seeding materials, and when there is a large influence of natural precipitation, the analysis time lay be set to be shorter in order to prevent excessive accumulation of precipitation.

In the seeded-area-setting step (S20), the seeded area may be determined depending on an influence of diffusion of the seeding materials.

In the non-seeded-area-setting step (S30), the non-seeded area may be set as an area that is not influenced by diffusion of the seeding materials under weather conditions and topographic conditions (observation altitude) similar to those of a rainfall system distributed in the seeded area.

In the non-seeded-area-setting step (S30), when there is no area that is not influenced by the seeding materials due to diffusion of the seeding materials over the entire system or when similar weather and topographic conditions are not found, the non-seeded area may be set as the same area as the seeded area, and data on the accumulated precipitation amount, measured in a previous time period during which there was no influence of the seeding materials, may be analyzed.

In the artificial precipitation increase/decrease amount analysis step (S40), when the number of places in each of the seeded area and the non-seeded area in which the rain gauge or the snow depth meter indicates accumulated precipitation of 0.1 mm or more is smaller than two, radar accumulated precipitation, estimated based on the HSR radar reflectivity at the position of each observatory in the target region and on the relational formula $Z=148R^{1.59}$ (Equation 1), may be used, and radar estimated precipitation may be used when the accuracy thereof is 60% or higher compared to the rain gauge.

In the artificial precipitation increase/decrease amount analysis step (S40), in order to exclude an influence of topographic effect, the value observed based on a rain gauge or a snow depth meter located in each mountainous region in the seeded area may be excluded from the calculation of the average value.

In the artificial precipitation increase/decrease amount analysis step (S40), when the difference between the precipitation average in the seeded area and the precipitation average in the non-seeded area has a positive value, it may be determined that a rain increase has occurred in the seeded area, and when the difference between the precipitation average in the seeded area and the precipitation average in the non-seeded area has a negative value, it may be determined that a rain decrease has occurred in the seeded area.

In the total artificial precipitation amount calculation step (S50), the total amount of artificial precipitation may be calculated using Equation 2 below.

$$\text{total amount of artificial precipitation (tons)} = \text{effective precipitation area} \times \text{artificial precipitation increase amount} \times \text{precipitation density} \qquad \text{(Equation 2)}$$

Here, because the unit of the effective precipitation area is $m^3$ and the unit of the artificial precipitation increase amount is mm, unit conversion may be necessary, the precipitation density assumed 1 $g/cm^3$, and the effective precipitation area may be determined considering only the area of a land region in which rain gauges or snow depth meters are distributed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and other advantages of the present invention will be more clearly understood from the following detailed description taken in conjunction with the accompanying drawings, in which.

DETAILED DESCRIPTION

An exemplary embodiment of a method of calculating the total amount of artificial precipitation in a seeded area compared to a non-seeded area according to the present invention will be described with reference to the accompanying drawings. A plurality of embodiments may be provided. The features, and advantages of the present invention will be more clearly understood from the following description of the embodiment.

Figure 1:
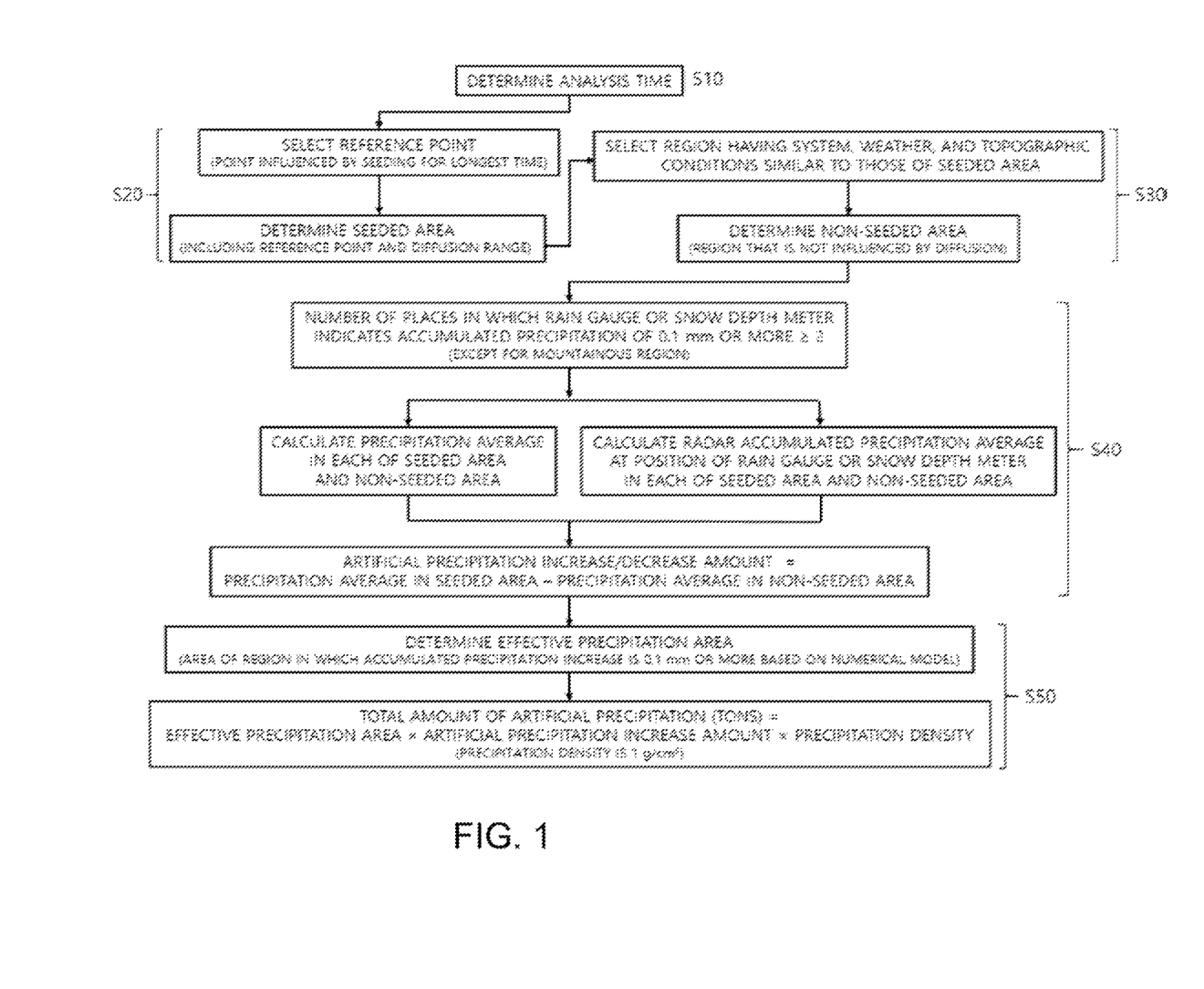
FIG. 1 is a flowchart showing a method of calculating the total amount of artificial precipitation in a seeded area compared to a non-seeded area according to the present invention.

FIG. 1 is a flowchart showing a method of calculating the total amount of artificial precipitation in a seeded area compared to a non-seeded area according to the present invention.

In the method of calculating the total amount of artificial precipitation in a seeded area compared to a non-seeded area according to the present invention, as shown in FIG. 1, seeding materials are seeded in an experimental area in order to stimulate artificial precipitation in a target region, and then the total amount of artificial precipitation in the area that is influenced by the seeding materials compared to the area that is not influenced by the seeding materials is calculated, thereby laying a foundation for aggressively solving a water shortage phenomenon through artificial precipitation using seeding materials.

In recent years, for the purpose of drought damage reduction, forest fire prevention, fog reduction, etc., the Korea Meteorological Administration and the National Institute of Meteorological Sciences have actively conducted weather modification experiments.

The purpose thereof is to control the occurrence of precipitation, among meteorological phenomena, so as to enable preparation for various disasters and stable supply of water resources.

As seeding materials for weather modification, silver iodide (AgI), which is an ice nucleus material, is used for cold clouds (0° C. or below), and calcium chloride ($CaCl_2$), which is a hygroscopic material, is used for warm clouds (above 0° C.). These seeding materials perform a series of processes for growing precipitation clouds by controlling collisions and merging between naturally distributed cloud particles.

In general, weather modification experiments are classified into artificial rain increase experiments for increasing the amount of rainfall and artificial snow increase experiments for increasing the amount of snowfall.

The National Institute of Meteorological Sciences has conducted seeding experiments by spraying, seeding materials, such as calcium chloride ($CaCl_2$) and silver iodide (AgI), into various types of cloud systems, including a stratus and a medium-scale cloud, using a meteorological aircraft.

In addition, a ground observation network has been established and operated in order to verify the influence of seeding materials on precipitation increase.

Basically, precipitation change in an area in which a seeding effect is expected is analyzed based on the result of simulation of a change in precipitation according to a numerical model. However, because it is difficult to track introduction of natural precipitation into seeding clouds or the direction in which seeding materials move, there is a limitation in that it is not straightforward to quantitatively determine an increase in the amount of rainfall or an increase in the amount of snowfall, i.e. the amount of artificial precipitation.

Therefore, there is need for a method of logically estimating a seeding effect based on observation data.

Accordingly, according to the present invention, a quantitative increase in artificial precipitation in the area that is influenced by the seeding materials compared to the area that is not influenced by the seeding materials is calculated in order to verify the influence of seeding on precipitation increase after a weather modification experiment.

The present invention proposes an approach to distinguish the amount of precipitation increase caused by seeding from the amount of precipitation caused by a natural precipitation system distributed in the seeded area, and enables evaluation of the performance of a model based on a comparison between the numerical simulation result and an observed value. In addition the present invention is advantageously capable of calculating the amount of water resources that can be secured through a weather modification experiment using the amount of artificial precipitation in a seeded area.

According to the present invention, a seeded area and a non-seeded area are distinguished from each other using, for example, data on diffusion and non-diffusion, ground precipitation, radar precipitation, weather conditions, and topographic conditions in order to calculate the total increase in the amount of artificial precipitation after an aerial experiment on artificial precipitation.

In addition, the present invention proposes a method of quantitatively determining the amount of precipitation increase caused by seeding materials so as to secure a sufficient amount of water through an artificial precipitation experiment, thereby leading to technology that lays a foundation for preparing measures to combat drought.

The specifications for performing the method of calculating the total amount of artificial precipitation in a seeded area compared to a non-seeded area according to the present invention are as follows.

radar reflectivity: HSR data over time (before seeding, 7 hours after seeding)/(.png) file ※ hybrid surface rainfall (HSR): radar minimum altitude angle observation data radar accumulated precipitation: resolution (1 km*1 km), analysis time (diffusion-influenced time)/(.txt) file ※ relationship between reflectivity (Z) and rainfall intensity (R): $Z=148R^{1.59}$ ground accumulated precipitation: rain gauge or snow depth meter/(.dat) file diffusion and non-diffusion results: 1 hour interval image in numerical model/(.png) file accumulated precipitation in numerical model: precipitation change (seeding-non-seeding)/(.png) file topographic conditions: Korean Peninsula DEM data/ (.dbf) file Specifically, in the method of calculating the total amount of artificial precipitation in a seeded area compared to a non-seeded area according to the present invention, a seeded area and a non-seeded area are distinguished from each other using data on a seeding material diffusion field, an accumulated precipitation change in a numerical model, weather conditions, ground accumulated precipitation, and radar accumulated precipitation, and the total amount of artificial precipitation that can be secured through a weather modification experiment is quantitatively calculated.

The method of the present invention may be broadly divided into an analysis time determination step (S10), a seeded-area-setting step (S20), a non-seeded-area-setting step (S30), an artificial precipitation increase/decrease amount analysis step (S40), and a total artificial precipitation amount (obtainable water resource amount) calculation step (S50).

Specifically, the method of calculating the total amount of artificial precipitation in a seeded area compared to a non-seeded area according to the present invention includes an analysis time determination step (S10) of setting a time period during which seeding materials seeded in an experimental area diffuse and have an influence on a rain gauge or a snow depth meter in a target region, a seeded-area-setting step (S20) of setting a seeded area including the point at which artificial precipitation has the greatest influence on the rain gauge or the snow depth meter in the target region due to the diffusion of the seeding materials seeded in the experimental area and the diffusion range of the seeding materials, a non-seeded-area-setting step (S30) of setting a non-seeded area having the same conditions as the seeded area, an artificial precipitation increase/decrease amount analysis step (S40) of calculating, when there are two or more places in each of the seeded area and the non-seeded area in which the rain gauge or the snow depth meter indicates accumulated precipitation of 0.1 mm or more, the average of precipitation data in the two or more places and the difference in the precipitation average between the seeded area and the non-seeded area to analyze the increase/decrease in the amount of artificial precipitation, and a total artificial precipitation amount calculation step (S50) of determining, when a precipitation increase occurs in the seeded area, the area of a region in which the accumulated precipitation increase is 0.1 mm or more as an effective area to calculate the total amount of artificial precipitation. It is possible to calculate the amount of water resources that can be secured through a weather modification experiment using the total amount of artificial precipitation in the seeded area and to secure a sufficient amount of water through an artificial precipitation experiment, thereby laying the foundation for preparing measures to combat drought.

Hereinafter, the method of calculating the total amount of artificial precipitation in a seeded area compared to a non-seeded area according to the present invention will be described in greater detail.

Analysis Time Determination Step (S10)

An analysis time is determined as a time period during which seeding materials diffuse and have an influence on a rain gauge or a snow depth meter in a target region. This is a process of determining the total accumulated time during which precipitation is expected to increase due to the seeding materials. The analysis time is determined as the time during which there is diffusion in a numerical model and the accumulated precipitation increases/decreases. For example, in the case in which there is a small influence of natural precipitation, the overall time during which the target region is influenced by the seeding materials may be considered. However, in the case in which there is a large influence of natural precipitation, the analysis time may be set to be shorter in order to prevent excessive accumulation of precipitation.

Seeded-Area-Setting Step (S20)

A seeded area is determined based on the point at which ground precipitation occurs and the seeding materials have the greatest influence on a rain gauge or a snow depth meter within the diffusion range. The seeded area is determined considering an entire range within which the seeding materials are diffused from a reference point. Therefore, the seeded area is determined depending on a diffusion region.

Non-Seeded-Area-Setting Step (S30)

A non-seeded area is set as an area that is not influenced by diffusion of the seeding materials under weather conditions and topographic conditions (observation altitude) similar to those of a rainfall system distributed in the seeded area. If there is no area that is not influenced by the seeding materials due to the diffusion of the seeding materials over the entire system or if similar weather and topographic conditions are not found, the non-seeded area is set as the same area as the seeded area, and data on the accumulated precipitation amount measured in a previous time period, during which there was no influence of the seeding materials, is analyzed (however, the analysis time is set to the same value).

Artificial Precipitation Increase/Decrease Amount Analysis Step (S40)

① When the rain gauge or the snow depth meter provided in each of the seeded area and the non-seeded area indicates accumulated precipitation of 0.1 mm or more, the average of precipitation data is calculated. If the number of places satisfying this condition is smaller than two, radar accumulated precipitation, which is estimated based on the HSR radar reflectivity at the position of each observatory and on the relational formula $Z=148R^{1.59}$ (Equation 1), is used (however, radar estimated precipitation is used only when the accuracy thereof is 60% or higher compared to the rain gauge). Here, the radar precipitation is an area average precipitation, but the value calculated using the data of the rain gauge or the snow depth meter may also be regarded as the area average precipitation that represents each area. Further, in order to exclude the influence of topographic effect, the value observed based on a rain gauge or a silos depth meter located in a mountainous region in each area is excluded from calculation of the average value.

② The amount of artificial precipitation increase for verifying the seeding effect is expressed using the difference in the area average accumulated precipitation between the seeded area and the non-seeded area (seeded area-non-seeded area). If the precipitation difference has a positive value, it is determined that a rain increase or a snow increase, i.e. a precipitation increase, has occurred in the seeded area, whereas if the precipitation difference has a negative value, it is determined that a precipitation decrease has occurred.

Total Artificial Precipitation Amount (Obtainable Water Resource Amount) Calculation Step (S50)

① When a precipitation increase occurs in the seeded area, the total amount of artificial precipitation (tons), which is the amount of water resources that can be secured through a weather modification experiment, is determined based thereon. To this end, it is required to determine an effective area of the region in which precipitation has occurred based on the simulation result of accumulated precipitation. The area of the region in which an accumulated precipitation increase is expected to be 0.1 mm or more based on the precipitation appearing in the numerical model is used as the effective precipitation area. In addition, the effective precipitation area is determined considering only the area of a land region in which rain gauges or snow depth meters are distributed.

② The total amount of artificial precipitation is calculated by multiplying the effective precipitation area, the amount of artificial precipitation increase, which is the area average accumulated precipitation calculated above, and the precipitation density, as expressed using the equation below.

$$\text{total amount of artificial precipitation (tons)} = \quad \text{(Equation 2)}$$
$$\text{effective precipitation area} \times \text{artificial precipitation}$$
$$\text{increase amount} \times \text{precipitation density}$$

Here, because the unit of the precipitation area is $m^3$ and the unit of the area average accumulated precipitation is mm, unit conversion is necessary, and it is assumed that the precipitation density is 1 $g/cm^3$. The calculated value represents the amount of water resources that can be secured through seeding, and indicates the quantitative seeding effect of a weather modification experiment.

In an artificial precipitation experiment conducted on Mar. 27, 2020, the obtainable amount of water resources was calculated using the algorithm described above. This example is an example in which a weather modification experiment was conducted in Gangwon-do region, northeast area of South Korea, in order to prevent forest fire.

Data used to analyze a seeding effect is illustrated by way of example in FIGS. 2 to 5.

Figure 2:
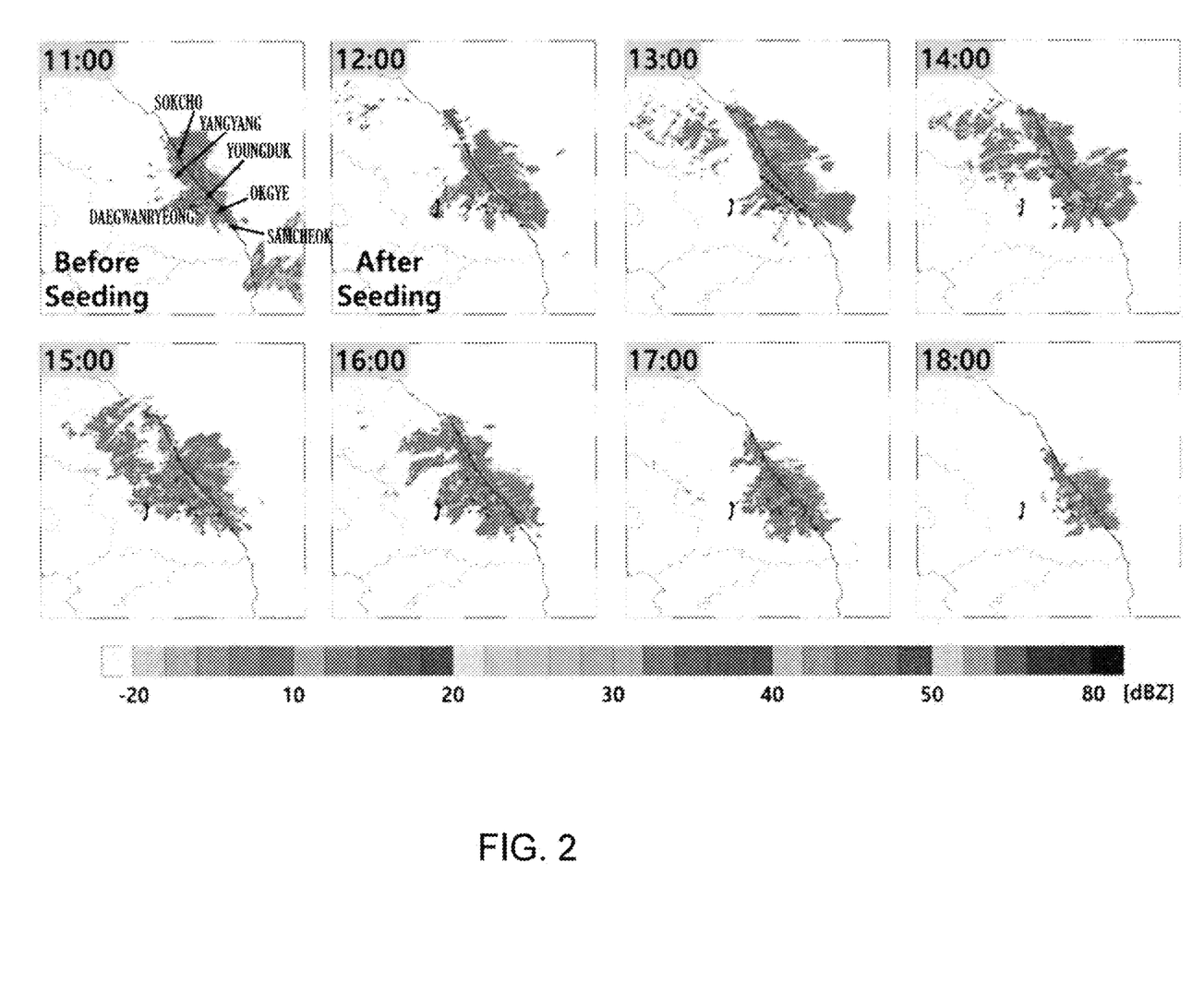
FIG. 2 illustrates radar reflectivity (HSR) images over time for explaining the method of calculating the total amount of artificial precipitation in a seeded area compared to a non-seeded area according to the present invention.
Figure 3:
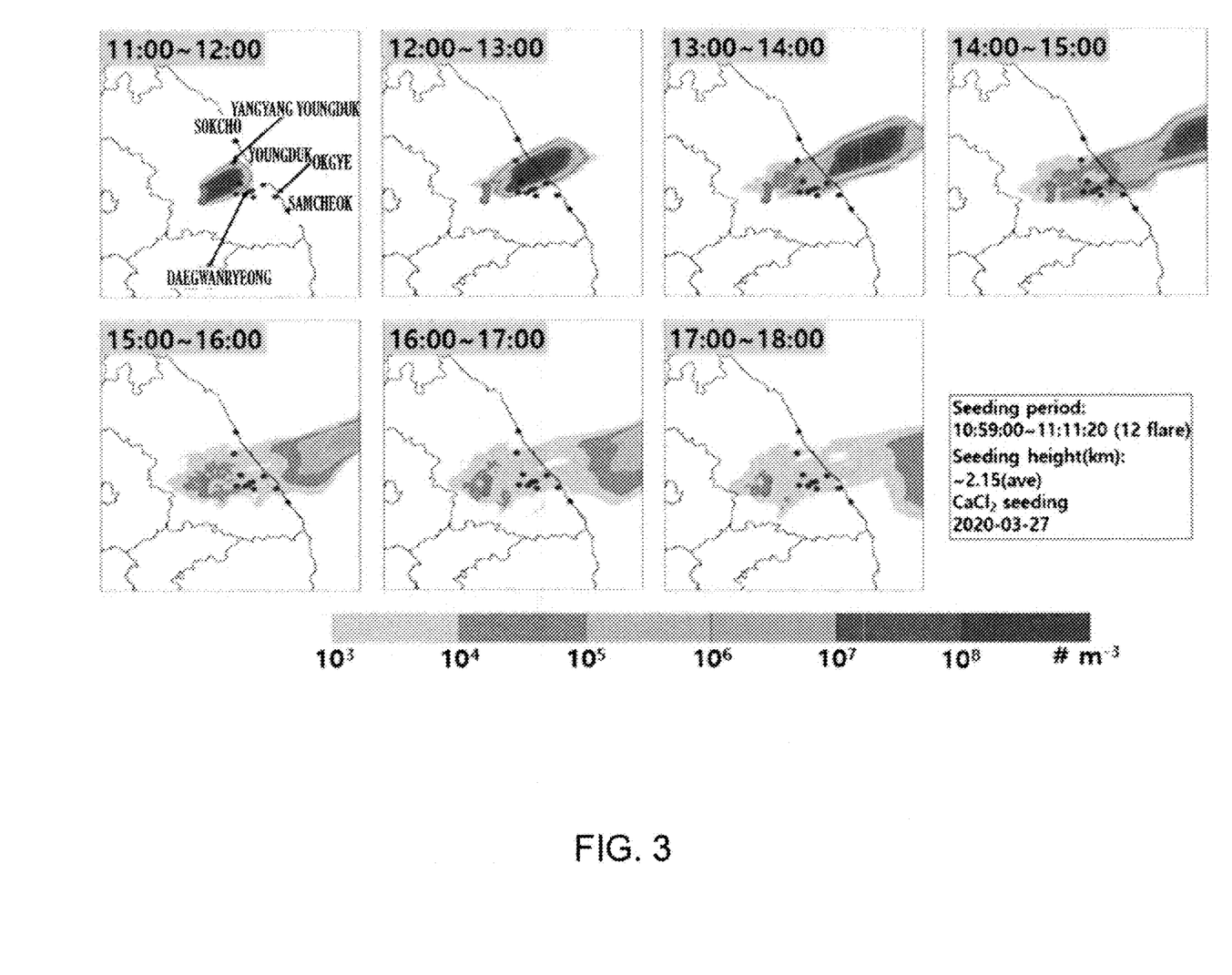
FIG. 3 illustrates seeding material diffusion images over time for explaining the method of calculating the total amount of artificial precipitation in a seeded area compared to a non-seeded area according to the present invention.
Figure 4:
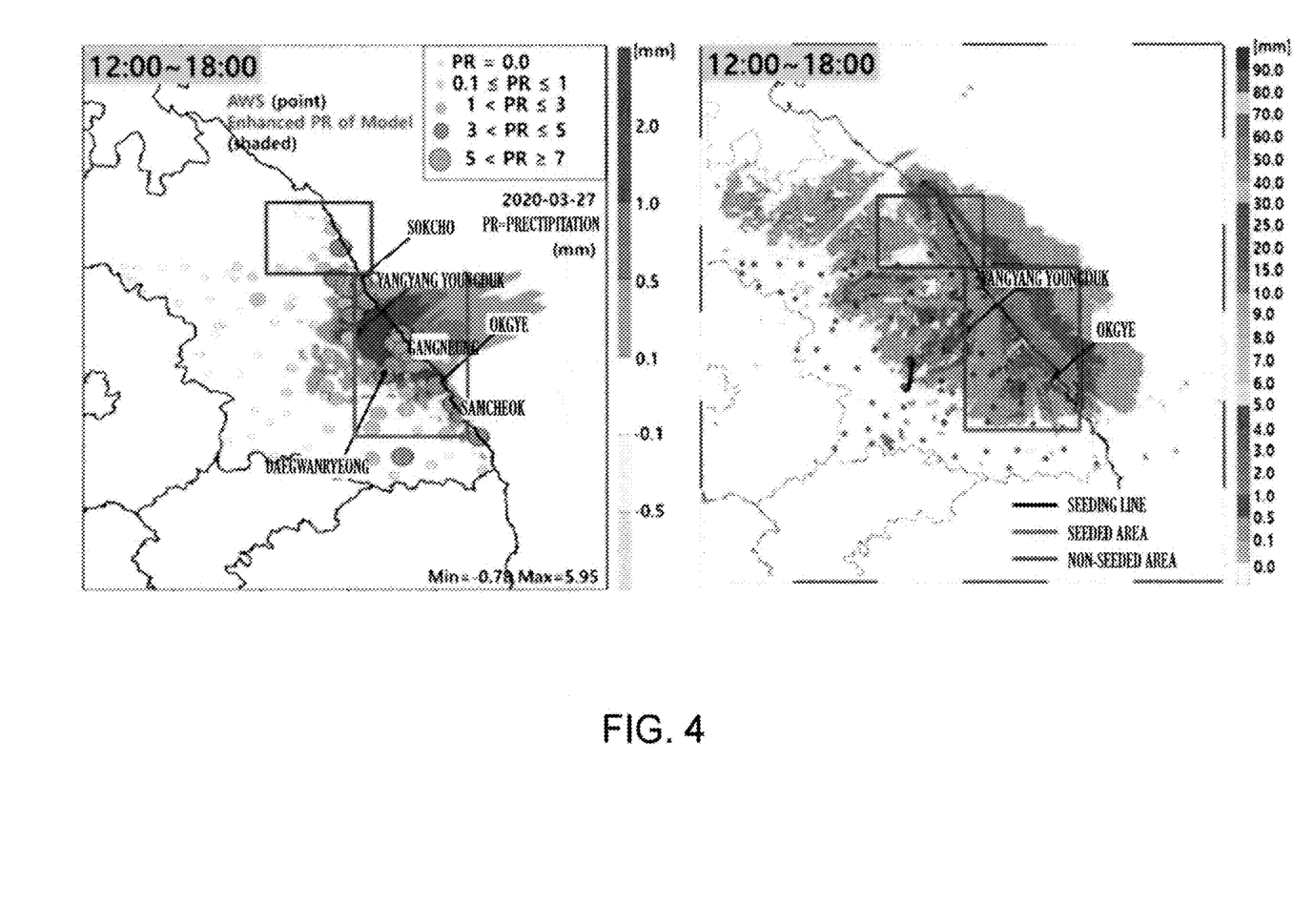
FIG. 4 illustrates a ground and numerical model accumulated precipitation image (left) and a radar accumulated precipitation image (right) for explaining the method of calculating the total amount of artificial precipitation in a seeded area compared to a non-seeded area according to the present invention.

FIG. 2 illustrates radar reflectivity (HSR) images over time for explaining the method of calculating the total amount of artificial precipitation in a seeded area compared to a non-seeded area according to the present invention, which shows a mixed state of seeding materials and a natural precipitation system after seeding, FIG. 3 illustrates seeding material diffusion images over time for explaining the method of calculating the total amount of artificial precipitation in a seeded area compared to a non-seeded area according to the present invention, which clearly distinguishes a region that is influenced by the seeding materials and a region that is not influenced by the seeding materials based on a diffusion numerical model, and FIG. 4 illustrates a ground and numerical model accumulated precipitation image (left) and a radar accumulated precipitation image (right) for explaining the method of calculating the total amount of artificial precipitation in a seeded area compared to a non-seeded area according to the present invention, based on which the precipitation change in the numerical model is verified using the accumulated change in the ground precipitation and the radar precipitation.

Figure 5:
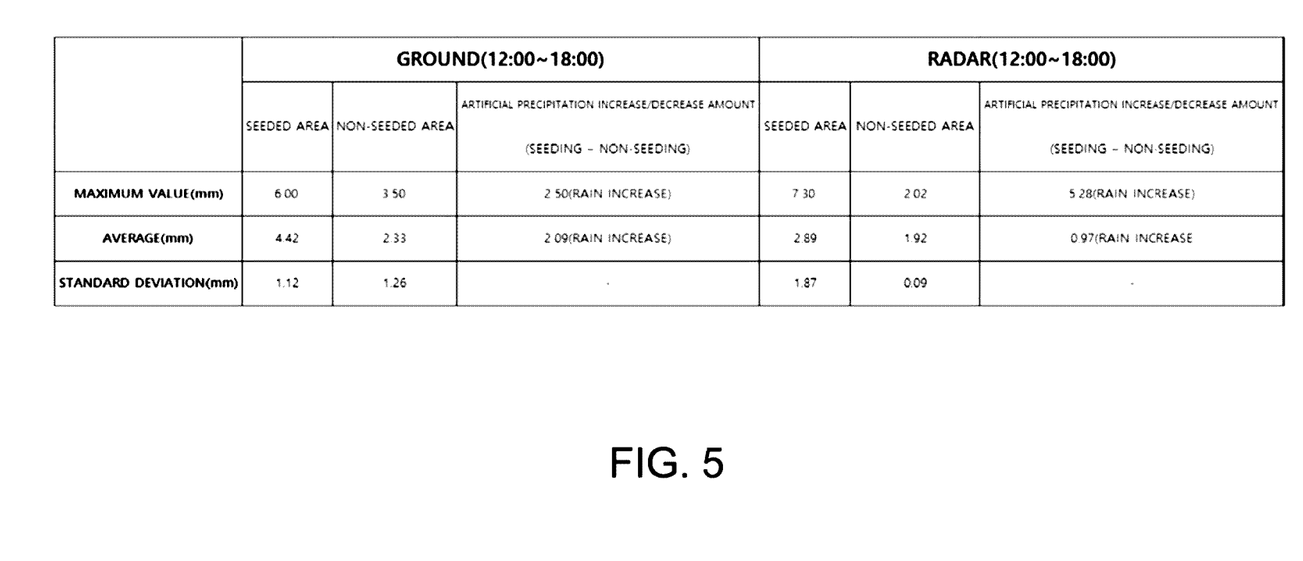
FIG. 5 is a table showing ground and radar accumulated precipitation changes in seeded and non-seeded areas in order to explain the method of calculating the total amount of artificial precipitation in a seeded area compared to a non-seeded area according to the present invention.

FIG. 5 is a table showing ground and radar accumulated precipitation changes in the seeded and non-seeded areas in order to explain the method of calculating the total amount of artificial precipitation in a seeded area compared to a non-seeded area according to the present invention.

Specifically, it can be confirmed from the data that the seeding materials are mixed with natural precipitation. According to the algorithm, the analysis time was set to 6 hours in consideration of the diffusion range around a river in Gangwon-do, which is a target region, and a predetermined area was set as the seeded area. In addition, a northern region of the seeded area, in which diffusion of the seeding materials does not influence the precipitation system continuously distributed along the east coast, was set as the non-seeded area. In addition, in order to exclude the influence of a mountainous legion in Gangwon-do, data obtained at an observatory located on a coastline in each area was analyzed.

The basic statistic values of the ground and radar accumulated precipitation in the seeded area and the non-seeded area are shown in the table of FIG. 5, and the amount of artificial precipitation increase was calculated using the difference in value between the seeded area and the non-seeded area according to the algorithm.

As shown in the table of FIG. 5, the area average artificial precipitation increase with respect to 6-hour ground accumulated precipitation was about 2.1 mm and the radar accumulated precipitation was about 1.0 mm, based on which it can be seen that the radar accumulated precipitation was relatively underestimated. In this case, the value estimated based on the ground accumulated precipitation data is taken as the amount of artificial precipitation increase in order to ensure the reliability of the data.

When the amount of artificial precipitation increase is determined, it is possible to calculate the total amount of artificial precipitation by multiplying the precipitation area by the precipitation density. The precipitation area is the area of a region in which the accumulated precipitation increase was 0.1 mm or more based on the numerical model, and is 2,731 $km^2$, as shown in FIG. 4. The precipitation density is 1 $g/cm^3$, and the total amount of artificial precipitation is calculated as follows.

$$2{,}731{,}000{,}000 \ m^2 \times 0.0021 \ m \times 1{,}000 \ kg/m^3 = 5{,}735{,}100$$
$$t$$

As such, in the ease in which the weather modification experiment described above was conducted in order to overcome drought, it is expected that about 5,735 million tons of water resources were obtained. Although this is not a notable amount of water, this is the result of quantitatively estimating the effect of weather modification experiments, and is significant in that a greater amount of water resources can be secured in the future by increasing the amount of seeding materials.

As a result, the method of calculating the total amount of artificial precipitation in a seeded area compared to a non-seeded area according to the present invention is capable of increasing the reliability of quantitative determination of seeding effect, observation data, and numerical model prediction data obtained from artificial precipitation experiments in the short term of increasing the amount of water resources through weather modification experiments, and of accomplishing various effects (drought reduction, forest fire prevention, fine dust reduction, fog reduction, hail suppression, etc.) and other related applications through artificial rainfall experiments in the long term.

In addition, the present invention is capable of improving the accuracy of correction and prediction of a numerical model obtained through weather modification experiments based on observation data, of establishing experimental and observation strategies for improving seeding efficiency in weather modification experiments, of developing the field study on cloud development and fine physical changes in the cloud after seeding, and of improving the economic feasibility of artificial rainfall experiments.

As is apparent from the above description, according to the present invention, seeding materials are seeded in an experimental area in order to stimulate artificial precipitation in a target region, after which the total amount of artificial precipitation in the area that is influenced by the seeding materials compared to the area that is not influenced by the seeding materials is calculated so as to lay a foundation for aggressively solving a water shortage phenomenon through artificial precipitation using seeding materials.

The present invention has an effect of enabling preparation for various disasters and stable supply of water resources by controlling the occurrence of precipitation, among meteorological phenomena.

The present invention has an effect of calculating a quantitative increase in artificial precipitation in the area that is influenced by the seeding materials compared to the area that is not influenced by the seeding materials in order to verify the influence of seeding on precipitation increase after a weather modification experiment.

The present invention has an effect of calculating the amount of water resources that can be secured through a weather modification experiment using the amount of artificial precipitation in a seeded area.

The present invention has an effect of securing a sufficient amount of water through air artificial precipitation experiment, thereby leading to technology that lays a foundation for preparing measures to combat drought.

The present invention is capable of increasing the reliability of quantitative determination of seeding effect, observation data, and numerical model prediction data obtained from artificial precipitation experiments in the short term, of increasing the amount of water resources through weather modification experiments, and of accomplishing various effects (drought reduction, forest fire prevention, fine dust reduction, fog reduction, hail suppression, etc.) and other related applications through artificial rainfall experiments in the long term.

The present invention is capable of improving the accuracy of correction and prediction of a numerical model obtained through weather modification experiments based on observation data, of establishing experimental and observation strategies for improving seeding efficiency in weather modification experiments, of developing the field of stud on cloud development and fine physical changes in the cloud after seeding, and of improving the economic feasibility of artificial rainfall experiments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention is applicable to industrial fields related to artificial precipitation increase experiments using weather conditions.

DESCRIPTION OF REFERENCE NUMERALS

S10: analysis time determination step
S20: seeded-area-setting step
S30: non-seeded-area-setting step
S40: artificial precipitation increase/decrease amount analysis step
S50: total artificial precipitation amount calculation step

What is claimed is:

1. A method of securing a desired amount of water resources through artificial precipitation, comprising:
    determining a total amount of artificial precipitation in a seeded area compared to a non-seeded area by seeding seeding materials in an experimental area in order to stimulate artificial precipitation in a target region and a total amount of artificial precipitation in an area that is influenced by the seeding materials and comparing the total amount of artificial precipitation in the area that is influenced by the seeding materials to an area that is not influenced by the seeding materials is, the determination comprising
        an analysis time determination step of setting a time period during which the seeding materials seeded in the experimental area diffuse and have an influence on a rain gauge or a snow depth meter in the target region;
        a seeded-area-setting step of setting a seeded area including a point at which artificial precipitation has a greatest influence on the rain gauge or the snow depth meter in the target region due to diffusion of the seeding materials seeded in the experimental area and a diffusion range of the seeding materials;
        a non-seeded-area-setting step of setting a non-seeded area having the same conditions as the seeded area;
        an artificial precipitation increase/decrease amount analysis step of determining, after there are two or more places in each of the seeded area and the non-seeded area in which the rain gauge or the snow depth meter indicates accumulated precipitation of 0.1 mm or more, a precipitation average using precipitation data in the two or more places and a difference between the precipitation average in the seeded area and the precipitation average in the non-seeded area to analyze increase and decrease in an amount of artificial precipitation; and
        a total artificial precipitation amount determination step of determining, after a precipitation increase occurs in the seeded area, an area of a region in which an accumulated precipitation increase is 0.1 mm or more has been identified as an effective area to determine a total amount of artificial precipitation; and
    seeding an area with seeding materials to obtain the desired amount of water resources for the area as a function of the step of determining the total amount of artificial precipitation in the seeded area compared to the non-seeded area.

2. The method according to claim 1, wherein, in the analysis time determination step, when there is a small influence of natural precipitation, the analysis time is determined considering an overall time during which the target region is influenced by the seeding materials, and when there is a large influence of natural precipitation, the analysis time is set to be shorter in order to prevent excessive accumulation of precipitation.

3. The method according to claim 1, wherein, in the seeded-area-setting step, the seeded area is determined depending on an influence of diffusion of the seeding materials.

4. The method according to claim 1, wherein, in the non-seeded-area-setting step, the non-seeded area is set as an area that is not influenced by diffusion of the seeding materials under weather conditions and topographic conditions (observation altitude) similar to those of a rainfall system distributed in the seeded area.

5. The method according to claim 4, wherein, in the non-seeded-area-setting step, when there is no area that is not influenced by the seeding materials due to diffusion of the seeding materials over an entire system or when similar weather and topographic conditions are not found, the non-seeded area is set as a same area as the seeded area, and data on an accumulated precipitation amount, measured in a previous time period during which there was no influence of the seeding materials, is analyzed.

6. The method according to claim 1, wherein, in the artificial precipitation increase/decrease amount analysis step, when a number of places in each of the seeded area and the non-seeded area in which the rain gauge or the snow depth meter indicates accumulated precipitation of 0.1 mm or more is smaller than two, radar accumulated precipitation, estimated based on an HSR radar reflectivity at a position of each observatory in the target region and on a relational formula $Z=148R^{1.59}$, is used, where Z is reflectivity and R is rainfall intensity, and radar estimated precipitation is used when an accuracy thereof is 60% or higher compared to the rain gauge.

7. The method according to claim 6, wherein, in the artificial precipitation increase/decrease amount analysis step, in order to exclude an influence of topographic effect, a value observed based on a rain gauge or a snow depth meter located in each mountainous region in the seeded area is excluded from determination of an average value.

8. The method according to claim 6, wherein, in the artificial precipitation increase/decrease amount analysis step, when the difference between the precipitation average in the seeded area and the precipitation average in the non-seeded area has a positive value, it is determined that a rain increase has occurred in the seeded area, and when the difference between the precipitation average in the seeded area and the precipitation average in the non-seeded area has a negative value, it is determined that a rain decrease has occurred in the seeded area.

9. The method according to claim 1, wherein, in the total artificial precipitation amount determination step, the total amount of artificial precipitation is determined according to an equation total amount of artificial precipitation (tons)=effective precipitation area×artificial precipitation increase amount×precipitation density wherein because a unit of the effective precipitation area is $m^3$ and a unit of the artificial precipitation increase amount is mm, unit conversion is necessary, the precipitation density is 1 $g/cm^3$, and the effective precipitation area is determined considering only an area of a land region in which rain gauges or snow depth meters are distributed.

10. A computer programmed to determine a total amount of artificial precipitation in a seeded area compared to a non-seeded area in which a seeding operation has been performed, the seeding operation including seeding seeding materials in an experimental area in order to stimulate artificial precipitation in a target region, setting a time period during which the seeding materials seeded in the experimental area diffuse and have an influence on a rain gauge or a snow depth meter in the target region, setting a seeded area including a point at which artificial precipitation has a greatest influence on the rain gauge or the snow depth meter in the target region due to diffusion of the seeding materials seeded in the experimental area and a diffusion range of the seeding materials, setting a non-seeded area having the same conditions as the seeded area, and measuring accumulated precipitation in a plurality of places in each of the seeded area and the non-seeded area, the computer being programmed to perform an artificial precipitation increase/decrease amount analysis step of determining, after there are two or more places in each of the seeded area and the non-seeded area in which the rain gauge or the snow depth meter indicates accumulated precipitation of 0.1 mm or more, a precipitation average using precipitation data in the two or more places and a difference between the precipitation average in the seeded area and the precipitation average in the non-seeded area to analyze increase and decrease in an amount of artificial precipitation; and a total artificial precipitation amount determination step of determining, after a precipitation increase occurs in the seeded area, an area of a region in which an accumulated precipitation increase is 0.1 mm or more has been identified as an effective area to determine a total amount of artificial precipitation.

\* \* \* \* \*

UNITED STATES PATENT AND TRADEMARK OFFICE
CERTIFICATE OF CORRECTION

| | | |
|---|---|---|
| PATENT NO. | : 11,782,187 B2 | Page 1 of 1 |
| APPLICATION NO. | : 17/124733 | |
| DATED | : October 10, 2023 | |
| INVENTOR(S) | : Yonghun Ro et al. | |

It is certified that error appears in the above-identified patent and that said Letters Patent is hereby corrected as shown below:

On the Title Page

Item (30) insert:
--(30) Foreign Application Priority Data
Sep. 14, 2020 (KR) 10-2020-0117464--.

Signed and Sealed this
Second Day of July, 2024

Katherine Kelly Vidal
*Director of the United States Patent and Trademark Office*